(12) United States Patent
Beach

(10) Patent No.: US 11,219,201 B2
(45) Date of Patent: Jan. 11, 2022

(54) LIVE BAIT PEN

(71) Applicant: Theodore W. Beach, New Carlisle, OH (US)

(72) Inventor: Theodore W. Beach, New Carlisle, OH (US)

( * ) Notice: Subject to any disclaimer, the term of this patent is extended or adjusted under 35 U.S.C. 154(b) by 221 days.

(21) Appl. No.: 16/728,107

(22) Filed: Dec. 27, 2019

(65) Prior Publication Data

US 2020/0137997 A1  May 7, 2020

Related U.S. Application Data

(62) Division of application No. 15/371,504, filed on Dec. 7, 2016, now Pat. No. 10,542,737.

(51) Int. Cl.
*A01K 97/05* (2006.01)
*A01K 97/20* (2006.01)
*A01K 97/04* (2006.01)

(52) U.S. Cl.
CPC .............. *A01K 97/05* (2013.01); *A01K 97/04* (2013.01); *A01K 97/20* (2013.01)

(58) Field of Classification Search
CPC ......... A01K 97/05; A01K 97/04; A01K 97/20
USPC ...................................................... 43/55–57
See application file for complete search history.

(56) References Cited

U.S. PATENT DOCUMENTS

| | | | | |
|---|---|---|---|---|
| 204,168 A | * | 5/1878 | Roney .................... | A01K 97/05 43/56 |
| 268,558 A | * | 12/1882 | Small .................... | A01K 97/04 43/55 |
| 299,690 A | * | 6/1884 | Sherwood ............. | A01K 97/05 43/56 |
| 302,086 A | * | 7/1884 | Barton .................. | A01K 97/05 43/56 |
| 311,346 A | * | 1/1885 | McKinney ............ | A01K 97/05 43/56 |
| 372,124 A | * | 10/1887 | Craig .................... | A01K 97/05 43/56 |
| 411,746 A | * | 9/1889 | Hurst .................... | A01M 21/00 43/65 |

(Continued)

FOREIGN PATENT DOCUMENTS

| | | | | |
|---|---|---|---|---|
| CA | 1201291 A | * | 3/1986 | ............. A01K 97/05 |
| CA | 2116604 C | * | 5/2004 | ............. A01K 97/05 |

(Continued)

*Primary Examiner* — Darren W Ark
(74) *Attorney, Agent, or Firm* — R. William Graham

(57) ABSTRACT

A live bait pen having a porous housing having top end and a bottom end and an interior defined therein, a fence framework to contain live bait therein, a central axial member fixed centrally within the porous housing; a movable container surface disposed within the housing and mounted to a central collar, the collar extending upward from the movable container surface and slidably receiving the same wherein the container surface moves with the collar and limits travel of the container surface a sufficient predetermined distance to be maintained in a predetermined retention zone, a line extending into the pen a sufficient length to permit the movable container surface to extend to the bottom end, and an openable lid operably disposed on the top end of the side framework portion to provide easy insertion and removal of bait to and from the pen.

8 Claims, 3 Drawing Sheets

(56) References Cited

U.S. PATENT DOCUMENTS

| | | | | |
|---|---|---|---|---|
| 504,526 A * | 9/1893 | Hemp | A01K 97/05 43/56 |
| 506,017 A * | 10/1893 | Ruprecht | A01K 97/05 43/56 |
| 513,740 A * | 1/1894 | Thoma et al. | A01K 97/05 43/56 |
| 531,112 A * | 12/1894 | Gilmore | A01K 97/05 43/56 |
| 553,456 A * | 1/1896 | Ferris | A01K 97/05 43/56 |
| 633,229 A * | 9/1899 | Clark | A01M 21/00 43/65 |
| 644,386 A * | 2/1900 | Watts | A01M 23/08 43/66 |
| 647,257 A * | 4/1900 | Gray | A01M 23/08 43/57 |
| 668,507 A * | 2/1901 | Fisk | A01K 97/05 43/57 |
| 713,890 A * | 11/1902 | Koch | A01K 97/05 43/56 |
| 731,398 A * | 6/1903 | Watson | A01M 21/00 43/65 |
| 769,874 A * | 9/1904 | Paar | A01K 97/05 43/56 |
| 859,617 A * | 7/1907 | Rimmelin | A01K 97/05 43/56 |
| 872,556 A * | 12/1907 | Carwile | A01M 21/00 43/65 |
| 953,540 A * | 3/1910 | Montgomery | A01K 97/05 43/56 |
| 965,662 A * | 7/1910 | Sonke | A01K 97/05 43/56 |
| 980,148 A * | 12/1910 | Garrard | A01K 97/04 43/55 |
| 986,229 A * | 3/1911 | Seeger | A01K 97/05 43/56 |
| 1,110,892 A * | 9/1914 | Cather | A01K 97/05 43/56 |
| 1,151,699 A * | 8/1915 | McBride | A01K 97/04 43/55 |
| 1,237,399 A * | 8/1917 | Sloan | A01K 69/06 43/65 |
| 1,436,835 A * | 11/1922 | Van Pelt | A01K 97/05 43/56 |
| 1,488,331 A * | 3/1924 | Ferris | A01K 97/05 43/56 |
| 1,638,238 A * | 8/1927 | Brautigam | A01K 69/06 43/105 |
| 1,719,591 A * | 7/1929 | Collins | A01K 97/20 43/55 |
| 1,728,645 A * | 9/1929 | Ward | A01K 69/08 43/100 |
| 1,745,012 A * | 1/1930 | Gilmore | A01K 97/05 43/56 |
| 1,986,742 A * | 1/1935 | Mosher | A01K 97/05 43/55 |
| 1,996,303 A * | 4/1935 | McConnell | A01K 97/20 248/99 |
| 2,082,754 A * | 6/1937 | Peterson | A01K 97/05 43/56 |
| 2,093,132 A * | 9/1937 | Logan | A01K 97/05 43/56 |
| 2,111,959 A * | 3/1938 | Baxter | A01K 97/05 43/55 |
| 2,123,471 A * | 7/1938 | Lewis | A01M 23/00 43/100 |
| 2,149,482 A * | 3/1939 | Whitaker | A01K 97/04 43/55 |
| 2,169,941 A * | 8/1939 | Campbell | A01K 97/05 114/343 |
| 2,272,569 A * | 2/1942 | Luhmann | A01K 97/20 43/55 |
| 2,294,136 A * | 8/1942 | Smith | A01K 97/05 43/56 |
| 2,318,842 A * | 5/1943 | Eaton | B65D 83/005 134/135 |
| 2,474,745 A * | 6/1949 | Lewis | A01K 97/05 43/56 |
| 2,485,684 A * | 10/1949 | Aldredge, Sr. | A01K 97/20 43/55 |
| 2,487,645 A * | 11/1949 | Gershon | A01K 97/05 43/56 |
| 2,489,710 A * | 11/1949 | Janisch | A01K 97/05 43/56 |
| 2,530,449 A * | 11/1950 | Bush | A01M 23/16 43/102 |
| 2,531,628 A * | 11/1950 | Janisch | A01K 97/05 43/56 |
| 2,560,054 A * | 7/1951 | Wells | A01K 97/20 43/55 |
| 2,560,672 A * | 7/1951 | Volenec | A01K 97/05 43/57 |
| 2,564,513 A * | 8/1951 | Terwilliger | A01K 97/20 43/55 |
| 2,568,602 A * | 9/1951 | Anderson | A01K 97/04 43/55 |
| 2,600,826 A * | 6/1952 | Allen | A01K 97/05 43/56 |
| 2,639,540 A * | 5/1953 | Buford | A01K 69/06 43/102 |
| 2,657,496 A * | 11/1953 | Spotswood | A01K 97/05 43/55 |
| 2,663,115 A * | 12/1953 | McKissack | A01K 97/05 43/57 |
| 2,715,293 A * | 8/1955 | Martin | A01K 97/05 43/55 |
| 2,720,049 A * | 10/1955 | Basky | A01K 97/05 43/56 |
| 2,721,718 A * | 10/1955 | Wagner | A01K 97/05 248/214 |
| 2,731,761 A * | 1/1956 | Marshall | A01K 69/08 43/100 |
| 2,760,297 A * | 8/1956 | Buyken | A01K 69/08 43/105 |
| 2,834,138 A * | 5/1958 | Pedersen | A01K 77/00 43/11 |
| 2,846,807 A * | 8/1958 | Tucker | A01K 97/04 43/55 |
| 2,855,720 A * | 10/1958 | Allen | A01K 97/05 43/55 |
| 2,920,855 A * | 1/1960 | Giebel | A01K 97/05 248/231.71 |
| 2,963,814 A * | 12/1960 | Zabrocki | A01K 97/05 43/56 |
| 2,966,002 A * | 12/1960 | Hobson | A01K 97/05 43/55 |
| 2,966,758 A * | 1/1961 | Riedel | A01K 97/05 43/56 |
| 2,974,437 A * | 3/1961 | Stadler | A01K 97/05 43/55 |
| 2,990,642 A * | 7/1961 | Bloom | A01K 97/05 43/55 |
| 3,000,132 A * | 9/1961 | Koistinen | A01K 97/05 43/56 |
| 3,002,312 A * | 10/1961 | Barker | A01K 97/05 43/56 |
| 3,015,467 A * | 1/1962 | Vieaux | A01K 97/10 248/231.81 |
| 3,039,225 A * | 6/1962 | Semelka | A01K 97/05 43/56 |
| 3,141,257 A * | 7/1964 | Stull | A01K 97/20 43/55 |
| 3,212,210 A * | 10/1965 | Schmelzer, Jr. | A01K 97/05 43/57 |
| 3,217,444 A | 11/1965 | Howard | |
| 3,220,140 A * | 11/1965 | Shirley, Sr. | A01K 97/05 43/55 |

(56) References Cited

U.S. PATENT DOCUMENTS

| | | | | | |
|---|---|---|---|---|---|
| 3,315,403 | A * | 4/1967 | Smith | A01K 97/05 43/55 |
| 3,337,982 | A * | 8/1967 | Sajulan | A01K 69/08 43/65 |
| 3,354,575 | A * | 11/1967 | Darrow | A01K 97/05 43/56 |
| 3,372,784 | A * | 3/1968 | Ross | G07F 11/00 194/215 |
| 3,380,186 | A * | 4/1968 | Donner | A01K 97/05 43/56 |
| 3,394,486 | A * | 7/1968 | Morawetz | B63B 35/24 43/55 |
| 3,477,165 | A * | 11/1969 | Brancato | A01K 97/05 43/55 |
| 3,513,584 | A * | 5/1970 | Donner | A01K 97/05 43/56 |
| 3,550,307 | A * | 12/1970 | Donner | A01K 97/05 43/56 |
| 3,640,494 | A * | 2/1972 | Ruter | A01K 97/20 248/515 |
| 3,699,702 | A * | 10/1972 | Lankenau | A01K 69/08 43/100 |
| 3,716,938 | A * | 2/1973 | Ammons | A01K 97/05 43/55 |
| 3,717,124 | A * | 2/1973 | Jacobs | A01K 61/60 119/223 |
| 3,722,844 | A * | 3/1973 | Baker | B63B 35/26 248/302 |
| 3,726,039 | A * | 4/1973 | Borrelli | A01K 97/05 43/56 |
| 3,786,593 | A * | 1/1974 | Gerbrandt | A01K 69/08 43/100 |
| 3,795,073 | A * | 3/1974 | Olsen | A01K 69/10 43/105 |
| 3,797,160 | A * | 3/1974 | Lewis, Jr. | A01K 97/05 43/55 |
| 3,834,062 | A * | 9/1974 | Nalepka | A01K 97/05 43/56 |
| 3,854,236 | A * | 12/1974 | Goserud | A01K 97/20 43/55 |
| 3,906,655 | A * | 9/1975 | Lowenthal, Jr. | A01K 69/08 43/100 |
| 3,938,276 | A * | 2/1976 | Mettler | A01K 97/20 43/55 |
| 3,955,306 | A * | 5/1976 | Handa | A01K 97/05 43/56 |
| 3,958,356 | A * | 5/1976 | Clingan | A01K 97/05 43/4 |
| 4,030,227 | A * | 6/1977 | Oftedahl | A01K 97/05 43/56 |
| 4,030,232 | A * | 6/1977 | Niva | A01K 69/08 43/105 |
| 4,297,804 | A * | 11/1981 | Weld | A01K 97/05 43/55 |
| 4,373,286 | A * | 2/1983 | Robison | A01K 69/00 43/10 |
| 4,509,288 | A * | 4/1985 | Shepherd | A01K 69/08 43/102 |
| 4,611,424 | A * | 9/1986 | Tarantino | A01K 69/08 43/100 |
| 4,627,189 | A * | 12/1986 | Pippin | A01K 97/05 43/55 |
| 4,638,588 | A * | 1/1987 | Abadie | A01K 61/80 43/44.99 |
| 4,686,788 | A * | 8/1987 | Hartman | A01K 97/05 206/315.11 |
| 4,706,409 | A * | 11/1987 | Downing | A01K 69/08 43/100 |
| 4,765,089 | A * | 8/1988 | Rowe | A01K 69/06 43/102 |
| 4,766,691 | A * | 8/1988 | Lynn | A01K 97/05 43/55 |
| 4,890,413 | A * | 1/1990 | Nelson | A01K 97/20 43/55 |
| 4,914,856 | A * | 4/1990 | Kennedy | A01K 69/00 43/100 |
| 4,937,967 | A * | 7/1990 | Wilding | A01K 97/20 43/55 |
| 4,979,328 | A * | 12/1990 | Poupore | A01K 69/06 43/100 |
| 4,980,989 | A * | 1/1991 | Davis | A01K 69/06 43/100 |
| 5,109,625 | A * | 5/1992 | Skrede | A01K 97/05 220/263 |
| 5,123,198 | A * | 6/1992 | Von Grossmann | A01K 97/05 43/55 |
| 5,138,975 | A * | 8/1992 | Walsh | A01K 63/02 119/203 |
| 5,163,648 | A * | 11/1992 | Schneider | A01K 97/05 248/154 |
| 5,165,198 | A * | 11/1992 | Kilian, III | A01K 97/05 383/100 |
| 5,228,231 | A * | 7/1993 | Larson | A01K 97/05 43/55 |
| 5,390,439 | A * | 2/1995 | Kilian, III | A01K 63/006 43/55 |
| 5,507,113 | A * | 4/1996 | Keller | A01K 97/05 206/315.11 |
| 5,556,069 | A * | 9/1996 | Malmberg | A01K 97/05 248/291.1 |
| 5,586,406 | A * | 12/1996 | Lin | A01K 97/04 43/55 |
| 5,802,760 | A * | 9/1998 | Campbell | A01K 97/06 206/315.11 |
| 5,921,017 | A * | 7/1999 | Clark | A01K 97/05 43/57 |
| 6,000,168 | A * | 12/1999 | Demusz | A01K 69/06 43/55 |
| 6,032,404 | A * | 3/2000 | Cincibus | A01K 97/05 206/315.11 |
| 6,035,575 | A * | 3/2000 | Hilty | A01K 69/06 43/100 |
| D451,675 | S | 12/2001 | Hardy | |
| 6,421,951 | B1 * | 7/2002 | Kuhl | A01K 97/05 43/55 |
| D462,737 | S * | 9/2002 | Lipari | D22/136 |
| 6,584,727 | B1 * | 7/2003 | De Shazer | A01K 97/05 43/55 |
| D485,329 | S * | 1/2004 | Haws | D22/136 |
| 6,804,911 | B1 * | 10/2004 | Henke | A01K 69/06 43/100 |
| D499,164 | S * | 11/2004 | Lillard | D22/136 |
| 6,857,222 | B1 * | 2/2005 | King | A01K 97/05 43/55 |
| 6,886,291 | B1 * | 5/2005 | Jaggers | A01K 97/05 43/55 |
| D514,660 | S | 2/2006 | Murrell | |
| 7,299,585 | B2 * | 11/2007 | Perttu | A01K 97/05 43/56 |
| 7,313,887 | B2 * | 1/2008 | Hibbs | A01K 69/10 43/100 |
| 7,549,697 | B1 * | 6/2009 | Long | A01K 97/20 297/188.12 |
| 7,562,491 | B1 * | 7/2009 | Lueck | A01K 97/20 43/55 |
| 7,644,535 | B2 * | 1/2010 | Sloop | A01K 97/05 43/56 |
| 7,721,485 | B2 * | 5/2010 | Krom | A01M 23/02 43/100 |
| 8,117,783 | B2 * | 2/2012 | Hilty | A01K 69/06 43/100 |
| 8,240,080 | B1 * | 8/2012 | Lueck | A01K 97/05 43/55 |
| 8,402,689 | B2 * | 3/2013 | Stearns | A01K 69/08 43/105 |
| 8,832,993 | B1 * | 9/2014 | Emmons, Sr. | A01K 97/05 43/57 |
| 9,101,123 | B2 * | 8/2015 | Schaefbauer | A01K 97/04 |

(56) References Cited

U.S. PATENT DOCUMENTS

| | | | | |
|---|---|---|---|---|
| 9,345,238 B1* | 5/2016 | Higginbotham | A01K 97/05 | |
| 9,918,460 B2* | 3/2018 | Paquette | A01K 97/05 | |
| 10,542,737 B2* | 1/2020 | Beach | A01K 97/05 | |
| 2002/0020104 A1* | 2/2002 | Kolar | A01K 97/05 | 43/55 |
| 2008/0190010 A1* | 8/2008 | Neal | A01K 97/04 | 43/55 |
| 2008/0190011 A1* | 8/2008 | Neal | A01K 97/05 | 43/56 |
| 2008/0236020 A1* | 10/2008 | Murrell | A01K 83/06 | 43/4.5 |
| 2008/0250697 A1* | 10/2008 | Wasnick | A01K 97/05 | 43/56 |
| 2008/0256842 A1* | 10/2008 | Vasseghi | A01M 23/08 | 43/65 |
| 2009/0025271 A1* | 1/2009 | Duckworth | A01K 97/02 | 43/17.5 |
| 2009/0119976 A1* | 5/2009 | Allen | A01K 97/05 | 43/55 |
| 2011/0146134 A1* | 6/2011 | Goodwin, III | A01K 69/08 | 43/65 |
| 2013/0042518 A1* | 2/2013 | Olson | A01K 97/05 | 43/56 |
| 2014/0165451 A1* | 6/2014 | Scheibmeir | A01K 97/05 | 43/57 |
| 2015/0157002 A1 | 6/2015 | Paquette | | |
| 2017/0172122 A1* | 6/2017 | Nguyen | A01K 69/08 | |
| 2017/0223940 A1 | 8/2017 | Bailey | | |
| 2017/0265447 A1* | 9/2017 | Tano | A01K 63/02 | |

FOREIGN PATENT DOCUMENTS

| | | | | |
|---|---|---|---|---|
| CA | 2471644 A1 | * | 9/2005 | A01K 97/05 |
| DE | 3204283 A1 | * | 8/1983 | A01K 97/05 |
| EP | 0354640 A2 | * | 2/1990 | A01K 97/20 |
| JP | 09037697 A | * | 2/1997 | |
| JP | 10323151 A | * | 12/1998 | |
| JP | 2000125740 A | * | 5/2000 | |
| JP | 2011010600 A | * | 1/2011 | |
| JP | 2016101134 A | * | 6/2016 | |
| KR | 20090076491 A | * | 7/2009 | |
| WO | WO-8600784 A1 | * | 2/1986 | A01K 97/20 |

* cited by examiner

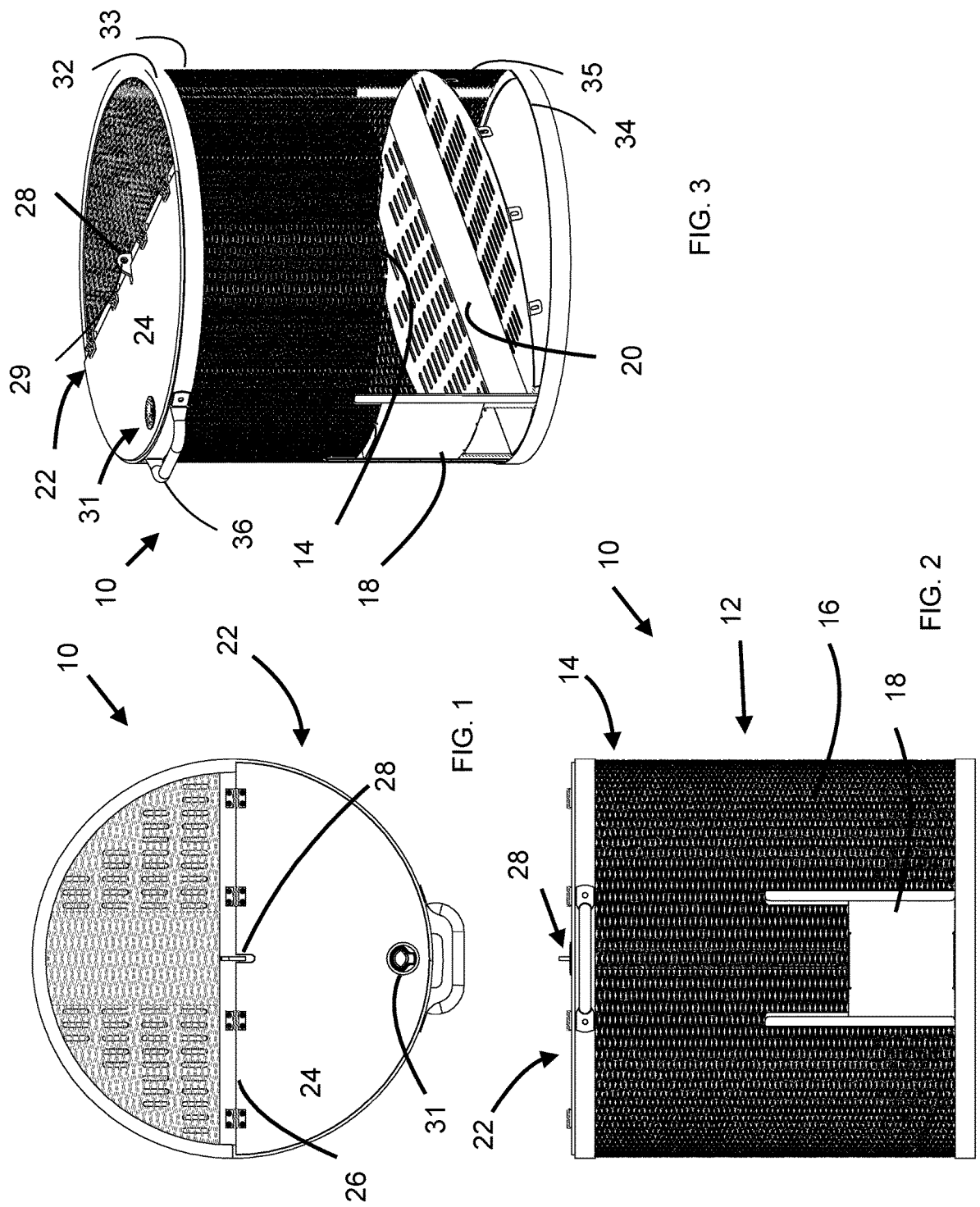

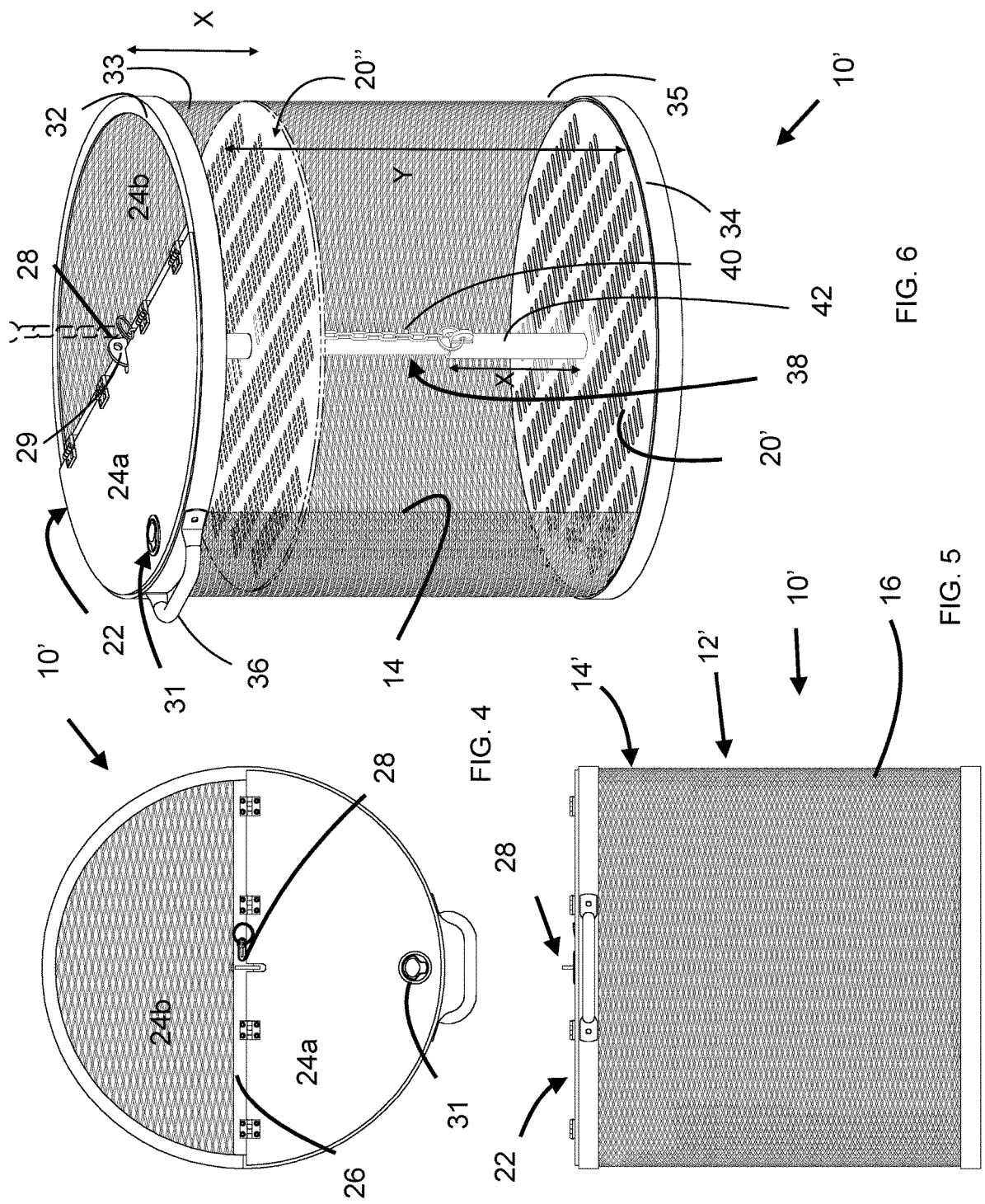

LIVE BAIT PEN

1. FIELD OF INVENTION

The invention relates to bait containers. More particularly, the invention relates to a live bait pen having a bottom which is characterized to facilitate removal of the bait therein.

2. BACKGROUND OF INVENTION

There exist numerous different types of bait containers in the fishing industry. Such prior containers typically include a housing and a door or lid which can be opened to place the live bait therein and then closed to contain same. In the case of sport fishing, this bait can be expensive and preserving this bait in an effective manner is thus important in the sport.

Some of these containers include a basket which includes flexible or rigid open new framework which permits water to pass therethrough. Some prior devices simply employ nets to contain the bait. Typically, at least a portion of the container is disposed into the water so that the fish, for example, are submerged in a confined yet livable environment. Ease and safety in retrieving the bait from the container is also important aspect of a pen.

Many containers have doors located on the top or sides. Other containers include a porous basket inside of a closed outer basket where the inner basket can be removed to pull out bait where water remains contained in the closed outer basket.

One prior container provides a rail upon which the container moved axially up and down out of and into the water. Other pens are internally formed into a boat hull.

There remains a need for improvement in live bait pens. There also remains a need to improve sport fishing and reduce expense in so doing. The present invention overcomes deficiencies in the prior art.

3. SUMMARY OF INVENTION

An object of the invention is to improve sport fishing.

Another object is to provide a live bait pen which lends itself to really insertion and removal of live bait in a safe manner.

Still another object is to provide a live bait pen with an improved sustainable environment for live bait therein.

Another object is to provide a live bait pen in which the container includes means to migrate bait therein toward a door or cover as the container as it is being elevated out of the water to facilitate selection of bait.

A further object is to provide a live bait pen which may be readily movable from the water to a boat and then back to the water wherein the bait is safely maintained therein.

Accordingly, one embodiment of the invention includes a porous housing, an openable door operably connected to a side thereof, and a container surface therein pitched toward the door to serve as a funnel. There can also be an openable lid operably disposed on a top of the housing to provide easy insertion of bait therein. The door can be hinged or sliding and can preferably be adjacent the low point of the housing.

Another embodiment is directed to porous housing, and a container surface, such as a bottom, which is axially movable up and down and can be disposed about a central axial member. The bottom is connected to a line which enables movement up and down thus serves to bring bait therein toward a top of the housing for ease of retrieving the bait. There can also be an openable lid operably disposed on a top of the housing to provide easy insertion and removal of bait.

Both versions can have a an eyelet hook on top to permit the pen to be lifted from the water.

These and other objects of the invention will be apparent to those skilled in the art when reviewing the instant invention, and the objects contemplated are attained, as hereinafter set forth, and pointed out in the appended claims and illustrated in the accompanying drawings. The accompanying drawings are illustrative only, and that changes may be made in the specific construction illustrated and described herein and within the scope of the appended claims.

4. BRIEF DESCRIPTION OF THE DRAWINGS

FIG. 1 is a top plan view of one embodiment of the invention;

FIG. 2 is a side view of FIG. 1;

FIG. 3 is a partially revealed perspective view of the embodiment of FIG. 1;

FIG. 4 is a top plan view of another embodiment of the invention;

FIG. 5 is a side view of FIG. 4;

FIG. 6 is a partially revealed perspective view of the embodiment of FIG. 4.

4. DETAILED DESCRIPTION OF PREFERRED EMBODIMENTS

Figure 7:
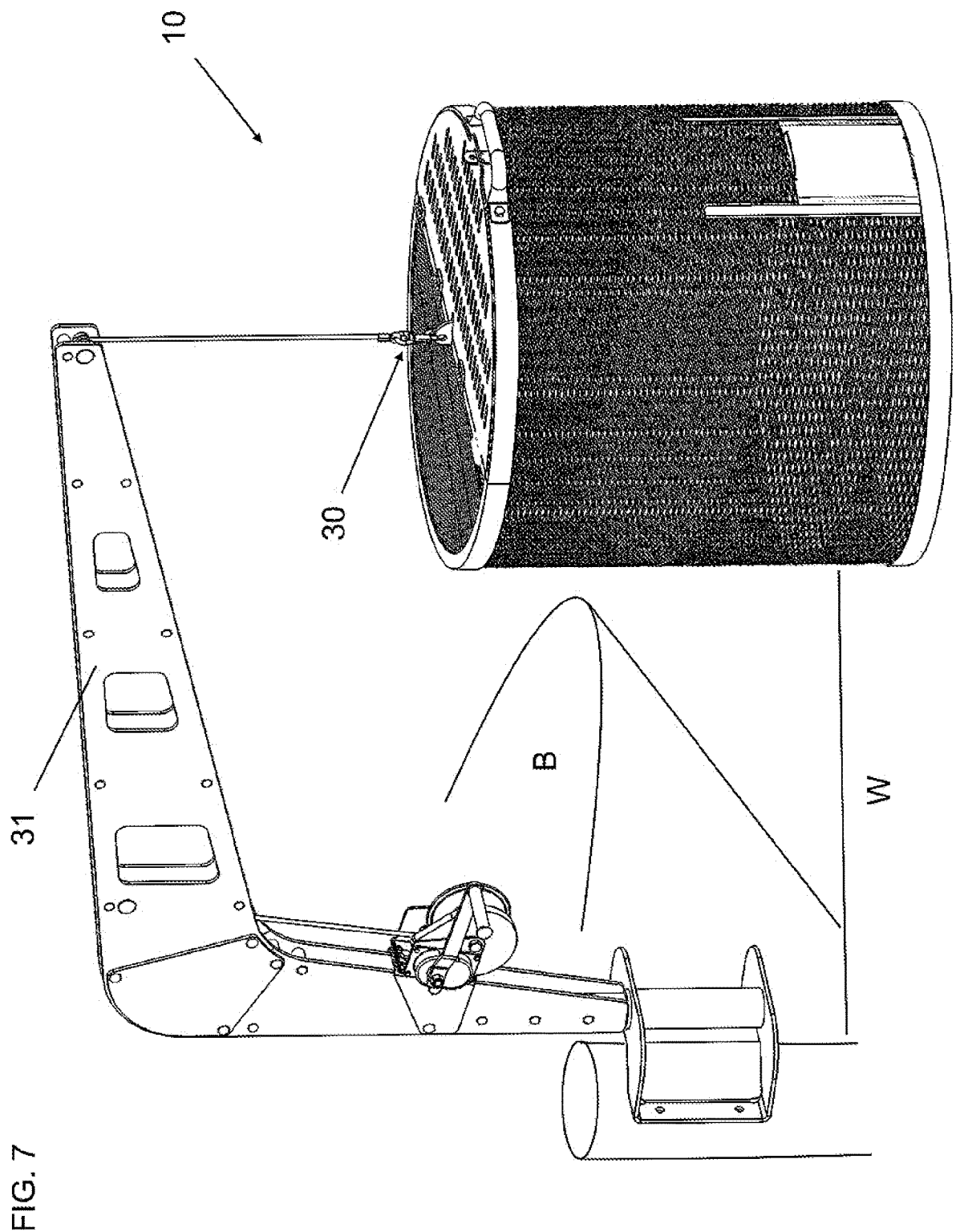
FIG. 7 is a perspective of an embodiment of the invention in use.

Referring now to the drawings, a live bait pen will generally referred to by the numeral 10 and 10' which provides an improved sustainable environment for live bait; therein. Like numerals will identify like parts and in describing one embodiment, while only one numeral may be mentioned, the relevant description applies equally to like components of each embodiment.

The live bait pen 10 and 10' can be readily retrieved from the surrounding water W of a boat B onto the boat B with live bait contained therein can be removed in a manner described herein and post removal submerged back into the water W wherein the bait is safely maintained therein.

In one embodiment, the live bait pen 10 includes a porous housing 12 which can include a fence or grate like framework 14. The framework 14 can be made of metal, plastic or other suitable material to accomplish the goals herein.

In one shown embodiment, the framework 14 can include a generally cylindrical side framework portion 16 having an openable door 18 to selectably open and close about an opening in the side framework 16 and is operably connected to a part of the side framework 16. Disposed within the side of framework portion 16 is a container surface 20, such as a bottom, which is pitched toward the door 18 to serve as a funnel. The bottom 20 can be solid or open framework of metal, plastic or other suitable material. The door 18 can be hinged or sliding and can preferably be adjacent the low point of the housing 12.

There can also be an openable lid 22 operably disposed on a top of the side framework portion 16 to provide easy insertion of bait therein. The lid 22 can be solid or open framework of metal, plastic or other suitable material. The lid 22 can include one or more pieces 24 which are separated by one or more transverse members 26 interconnecting the top of side framework portion 16. The pieces 24A and 24B can be configured to provide one or more to be openable. The lid piece 24A can be hinged to transverse member 26. The lid piece 24*a* can include a grasping surface 31 to aid in opening and closing the same.

At least one of the transverse members 26 can include a flange 28 with eyelet 29 to which a hoist clip 30 of boom 31 can be connected. This permits the pen 10 to raise and lower the pen 10, 10' from the water W to boat B and vice versa.

Additionally, rims 32 and 34 can serve to contain part of respective upper portion 33 and lower portions 35 of side framework option 16. Additionally, rim 32 contains lid piece 24b which connects to transverse member 26. One or more handle 36 can be attached to the rim 32, for example Rim 34 defines an opening having a width along a width of the rim 34 as shown in FIG. 3.

Another embodiment is directed to porous housing 12', and a container surface 20', such as a bottom, extending normal to the bottom 20' and disposed within the housing 12' in a manner which is axially movable up and down and can be disposed about a central axial member 38 fixed centrally within the porous housing 12'. The bottom 20' is connected to a line or chain 40 via a collar 42 of a length X and mounted to the collar 42 which enables limited movement up and down about the central axial member 38 and thus serves to bring bait therein toward a top of the housing 12', with the bottom 20' limited predetermined distance X defined by the length of collar 42 and thus providing a predetermined retention zone Y within which the bait is maintained for assurance that the bait remains safely confined in water yet retrievably close to the top as desired for ease of retrieving the bait. It is noted that the bait pen 10 typically is maintained submerged to a point with the top 24 approximate water surface so maintaining the bottom 20' a distance below the water surface assures bait will be less stressed for increased use. FIG. 6 illustrates the bottom 20' and in phantom lines shows the bottom 20" in a raised position. There can also be an openable lid 22 operably disposed on a top of the housing 12 to provide easy insertion and removal of bait.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting.

It is to be understood that the terms used herein are merely descriptive rather than limiting and that various changes, numerous equivalents may be made without departing from the spirit or scope of the claimed invention.

What is claimed is:

1. A live bait pen, which includes:
    a porous housing having a top end and a bottom end, a fence framework and an interior defined therein to contain live bait therein, said porous housing having a rim at said bottom end which defines an opening having a width extending along a width of said rim, said opening allowing communication between the interior and an ambient environment outside of said porous housing;
    a central axial member fixed centrally within said porous housing;
    a movable container surface disposed within said housing and mounted to a central collar, said collar extending upward from said movable container surface and slidably receiving said central axial member in a manner and which is axially movable up and down about said central axial member wherein said container surface moves with said collar and said collar limits travel of said container surface a sufficient predetermined distance below said top end such that said bait is maintained in a predetermined retention zone below said top end, wherein said width of said opening is greater than a width of said collar;
    a line having an upper end above said top end and a lower end extending though said top end and connecting to said collar; and
    an openable lid operably disposed on said top end to provide easy insertion and removal of bait to and from said pen.

2. The live bait pen of claim 1, wherein said framework is made of metal or plastic.

3. The live bait pen of claim 1, wherein said container surface serves as a bottom.

4. The live bait pen of claim 1, wherein at least one of said movable container surface and said lid includes one of solid and open framework of metal and plastic.

5. The live bait pen of claim 1, wherein said lid includes at least two pieces separated by a transverse member interconnecting a top of framework.

6. The live bait pen of claim 5, wherein at least one of said at least two pieces is configured to be openable.

7. The live bait pen of claim 5, wherein said transverse member includes a mount eyelet to which a hoist clip can be connected to raise and lower said pen.

8. The live bait pen of claim 1, wherein said line is of a sufficient length to permit said movable container surface to move to said bottom end.

* * * * *